Nov. 13, 1923.
F. M. WAGNER
SAFETY PIN
Filed Jan. 18, 1923
1,474,127
FIG. I.
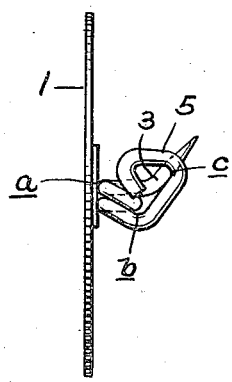
FIG. II.
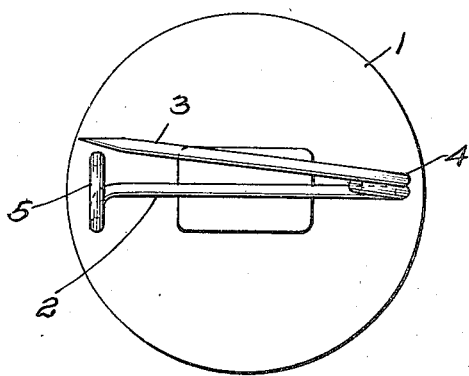
FIG. IV.
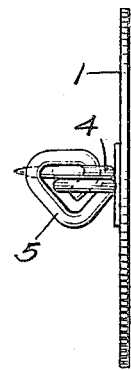
FIG. III.
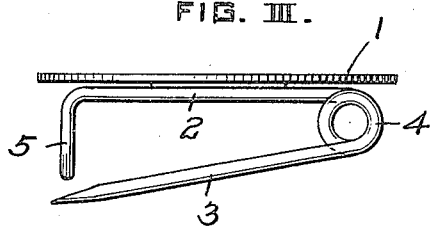
WITNESSES
J. Herbert Bradley.
Percy A. English.
INVENTOR
Francis M. Wagner
by Christy and Christy
his attorneys Patented Nov. 13, 1923.

1,474,127

UNITED STATES PATENT OFFICE.

FRANCIS M. WAGNER, OF PITTSBURGH, PENNSYLVANIA.

SAFETY PIN.

Application filed January 18, 1923. Serial No. 613,379.

*To all whom it may concern:*

Be it known that I, FRANCIS M. WAGNER, residing at Pittsburgh, in the county of Allegheny and State of Pennsylvania, a citizen of the United States, have invented or discovered certain new and useful Improvements in Safety Pins, of which improvements the following is a specification.

My invention relates to improvements in the structure of safety pins, and the object of improvement is to produce a pin more secure against unfastening than otherwise is the case.

A pin embodying my invention is illustrated in the accompanying drawings. The pin is here shown to be the securing means for a badge, and to this badge it is in suitable manner united. Figs. I, II, and III are views in elevation and from different points of view of the pin when unfastened. Fig. IV is a view corresponding to Fig. I, though in opposite direction, of the pin in closed position.

The pin proper is secured to the rear face of a badge 1. The pin itself is formed of a single length of wire, and ordinarily it will be formed of steel wire. One end of this length of wire is pointed; the other end is bent to form a seat 5 of the particular shape presently to be considered in detail; while, intermediate its ends, the length of wire is shaped to form the body shank 2, and the pin shank 3, continuous through the intermediate coiled spring 4. The body shank 2 is the part which is directly secured to the badge 1.

In forming the seat the length of wire is shaped, as best shown in Fig. I, into a triangular spiral arranged in a plane substantially perpendicular to the body shank 2 (cf. Fig. II). And this triangular spiral is so shaped and proportioned that a channel is formed along which the point of the pin must travel in fastening and unfastening. This channel is, with sufficient clearance for service, and with a qualification presently to be noted, of a width slightly exceeding the thickness of the pin point which traverses it; it is tortuous; its component reaches are straight-lined; and these straight-lined reaches are angularly disposed, one to another. Specifically, and with attention fixed upon Fig. I the course of the pin point in locking is from the point $a$ obliquely downward to the right, in straight-lined course, to the point $b$; thence obliquely upward to the right, in straight-lined course, to the point $c$, where the pin rests in locked position. And, still with Fig. I in view, it will be remarked that the pin shank 3 extends from spring 4 and swings normally in a plane with which the reach $b$—$c$ of the seat is substantially coincident. The tortuous channel above defined is preferably so minutely narrowed at the point $a$ that increased force must be applied to carry the pin point through. This means of course that the channel at that point is normally narrower than the thickness of the pin, and that in pressing the pin point through, the structure yields elastically.

Consider now the fastened pin. Unfastening is to be effected by pressure in a particular direction, the direction indicated by the line $c$—$b$, and then pressure continued in another particular direction, angular to the first, the direction indicated by the line $b$—$a$.

While it is common so to construct safety pins as to necessitate pressure in a particular direction to effect unfastening, it is I believe new to require pressure first in one particular direction and then in another particular direction, angularly disposed with respect to the first, and to constrict the passageway for the point of the pin within the catch so that the catch will yieldingly oppose unfastening.

It is I believe new to form a pin of a single length of wire having the catch formed spirally and disposed in a plane extending perpendicularly to the shank of the pin.

The structure is simple, easily and cheaply made, and durable.

I claim as my invention:

A safety pin formed of a single length of wire and including a body shank and a pin shank, continued through a resilient coil, the length of wire being at one end pointed and at the other end being coiled to the form of an angular spiral extending in a plane perpendicular to the body shank, whereby a channel is defined for the point of the pin in opening and closing, consisting of angularly disposed straight-line reaches, the inner reach extending in the plane of normal swing of the pin.

In testimony whereof I have hereunto set my hand.

FRANCIS M. WAGNER.

Witnesses:
WM. M. JENKINS,
JAS. H. MATTHEWS.